(12) United States Patent
Cirou et al.

(10) Patent No.: US 8,701,704 B2
(45) Date of Patent: Apr. 22, 2014

(54) MANIFOLD FOR A DEVICE FOR FILTRATION WITH A SET OF LEAST ONE FILTER CASSETTE

(75) Inventors: Sebastien Cirou, Schiltigheim (FR); Jean-Louis Weissenbach, Ville (FR); Rene Reinbigler, Kirchheim (FR); Jean-Luc Beulay, Krautergersheim (FR); Frans Mels, Altenmarkt (AT); Cecile Delbos, Eschau (FR)

(73) Assignee: EMD Millipore Corporation, Billerica, MA (US)

( * ) Notice: Subject to any disclaimer, the term of this patent is extended or adjusted under 35 U.S.C. 154(b) by 334 days.

(21) Appl. No.: 13/106,265

(22) Filed: May 12, 2011

(65) Prior Publication Data

US 2012/0174996 A1 Jul. 12, 2012

(30) Foreign Application Priority Data

May 19, 2010 (FR) ...................................... 10 53880

(51) Int. Cl.
*F16K 27/00* (2006.01)
*B01D 35/00* (2006.01)

(52) U.S. Cl.
USPC .......................................... 137/544; 137/844

(58) Field of Classification Search
USPC ................................................ 137/544, 884
See application file for complete search history.

(56) References Cited

U.S. PATENT DOCUMENTS

| 3,495,604 A | * | 2/1970 | Trask .......................... 137/15.01 |
| 4,351,724 A | | 9/1982 | Jones |
| 4,855,062 A | | 8/1989 | Oelbermann |
| 5,096,582 A | * | 3/1992 | Lombardi et al. ......... 210/321.6 |
| 5,599,447 A | | 2/1997 | Pearl et al. |

(Continued)

FOREIGN PATENT DOCUMENTS

| AT | 293343 B | 10/1971 |
| CA | 1032480 A1 | 6/1978 |

(Continued)

OTHER PUBLICATIONS

French Search Report dated Nov. 25, 2010 in co-pending foreign application FR 1053875.

(Continued)

*Primary Examiner* — John Fox
(74) *Attorney, Agent, or Firm* — Nields, Lemack & Frame, LLC

(57) ABSTRACT

The invention concerns a manifold comprising: an auxiliary block (3) having cassette feed ports (20) and cassette filtrate return ports (21) each emerging through a bearing surface (7) and, on a counter-bearing surface (8) situated on the opposite side to the bearing surface (7), first recesses into each of which emerges a cassette filtrate return port (21); a main block (2) on which is fastened the auxiliary block (3), having an inlet conduit (14) and a filtrate outlet conduit (15), cassette feed intermediate ports which communicate with the inlet conduit (14) and with a cassette feed port (20), conveying cut-outs each facing a recess, and cassette filtrate return intermediate ports which communicate with the filtrate outlet conduit (15) and with a cassette filtrate return port (21).

13 Claims, 8 Drawing Sheets

(56) References Cited

U.S. PATENT DOCUMENTS

| | | | |
|---|---|---|---|
| 6,506,300 | B2 | 1/2003 | Kuss et al. |
| 7,306,727 | B2 * | 12/2007 | Perreault ............... 210/321.6 |
| 2005/0199559 | A1 | 9/2005 | Duby |
| 2007/0113907 | A1 * | 5/2007 | Brennen et al. ............ 137/833 |
| 2007/0132231 | A1 * | 6/2007 | Tokuda et al. ............ 285/124.5 |
| 2008/0135468 | A1 | 6/2008 | Gagnon et al. |
| 2008/0135499 | A1 | 6/2008 | Gagnon et al. |
| 2008/0135500 | A1 | 6/2008 | Gagnon et al. |
| 2012/0111782 | A1 | 5/2012 | Cirou et al. |
| 2013/0306539 | A1 | 11/2013 | Cirou et al. |

FOREIGN PATENT DOCUMENTS

| | | |
|---|---|---|
| DE | 37 08 734 A1 | 10/1987 |
| DE | 10 2006 009804 A1 | 9/2007 |
| EP | 0265794 A2 | 5/1988 |
| EP | 0498211 B1 | 11/1996 |
| EP | 1258282 A2 | 11/2002 |
| WO | 20041043577 A1 | 5/2004 |

OTHER PUBLICATIONS

French Search Report dated Nov. 25, 2010 in corresponding foreign application FR 1053880.

Office Action mailed Mar. 19, 2013 in co-pending U.S. Appl. No. 13/106,250.

Office Action—Restriction—mailed Feb. 13, 2013 in co-pending U.S. Appl. No. 13/106,250.

Notice of Allowance mailed Jul. 17, 2013 in co-pending U.S. Appl. No. 13/106,250.

Notice of Allowance mailed Sep. 18, 2013 in co-pending U.S. Appl. No. 13/106,250.

Extended European Search Report mailed Sep. 29, 2011 in co-pending European Patent Application No. EP 11290230.9.

Office Action mailed Dec. 24, 2013 in co-pending U.S. Appl. No. 13/106,250.

Office Action mailed Dec. 27, 2013 in co-pending U.S. Appl. No. 13/950,646.

Final Rejection mailed Jun. 26, 2013 in co-pending U.S. Appl. No. 13/106,250.

* cited by examiner

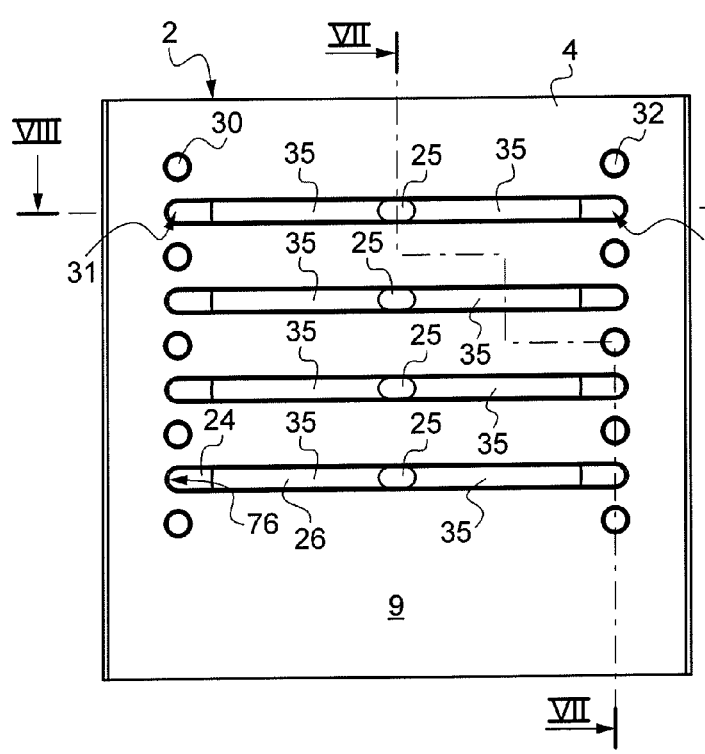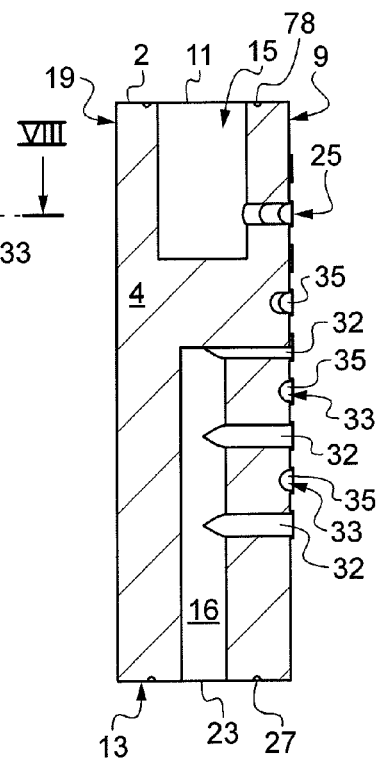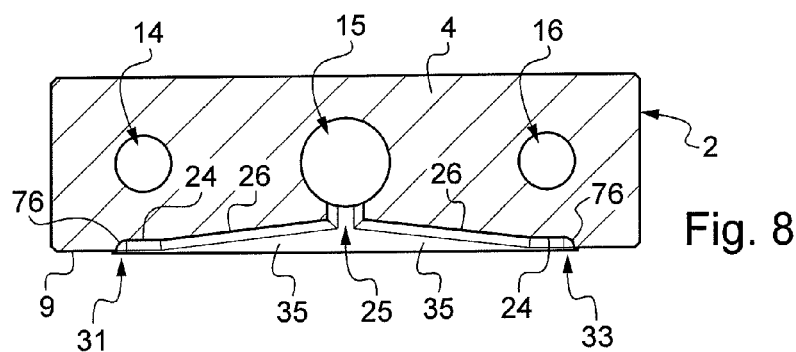

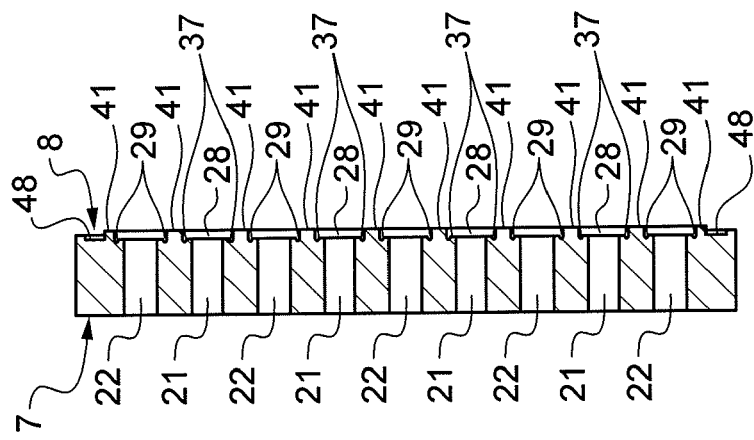
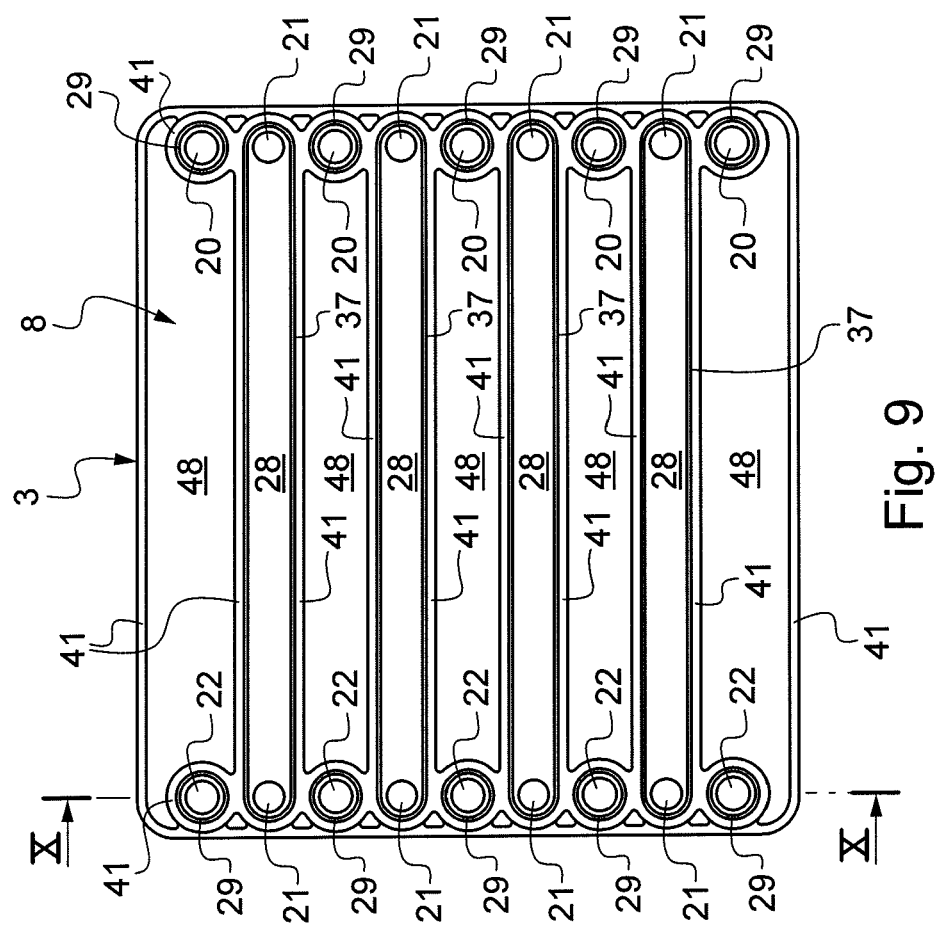

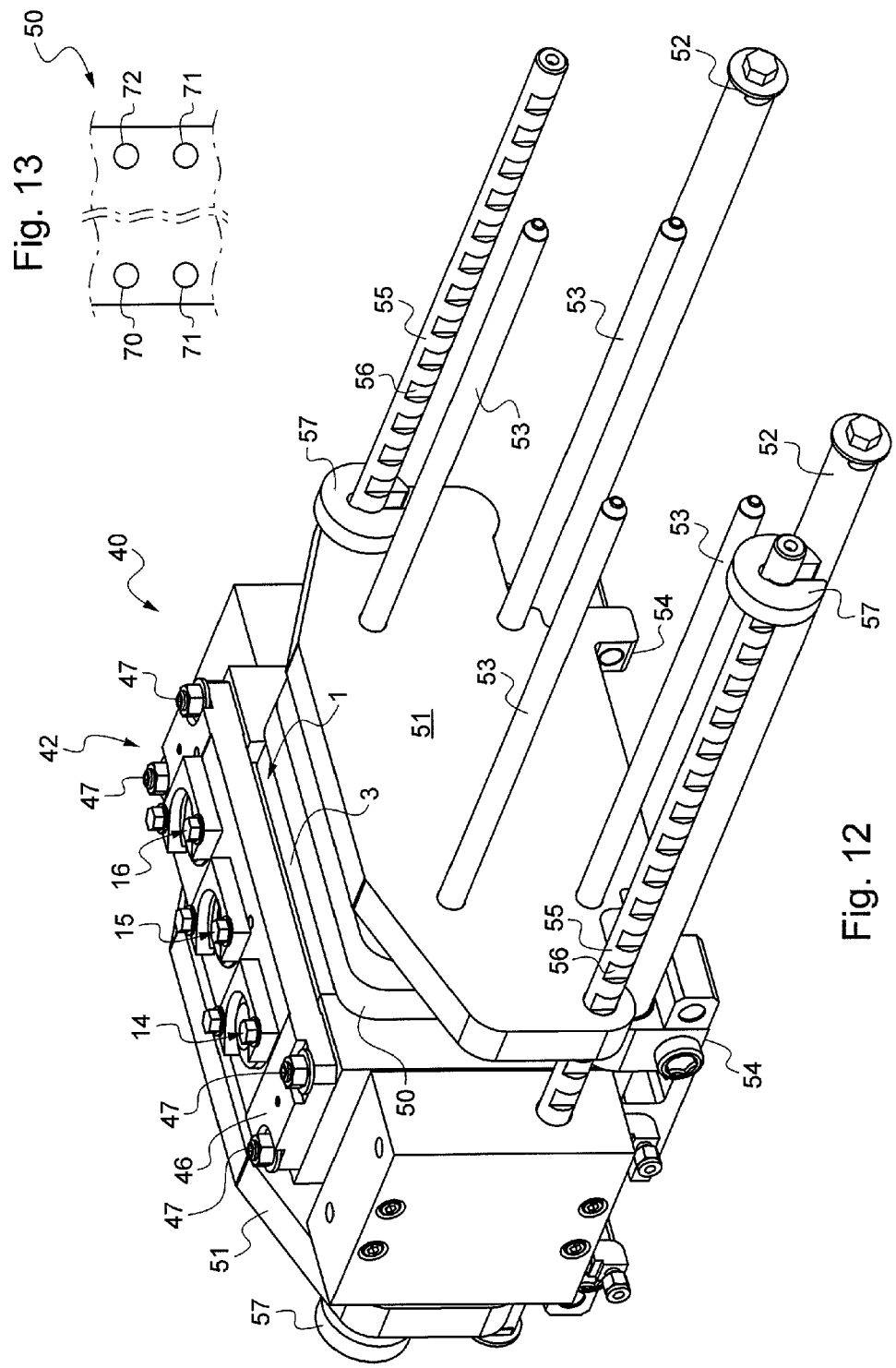

MANIFOLD FOR A DEVICE FOR FILTRATION WITH A SET OF LEAST ONE FILTER CASSETTE

FIELD

The invention concerns manifolds for devices for filtration of a fluid with a set of at least one filter cassette, which fluid is for example a biological liquid, and particularly but not exclusively a biopharmaceutical liquid.

BACKGROUND

Patent EP 0 498 211 describes a stainless steel manifold which comprises a stainless steel body provided with an inlet conduit having a flow inlet for a fluid to treat, a filtrate outlet conduit having a filtrate flow outlet for a treated fluid termed filtrate, and a retentate outlet conduit having a retentate flow outlet for a treated fluid termed retentate.

This manifold has a bearing surface against which an end cassette of the cassette set comes to bear tightly. Through this bearing surface emerge cassette feed ports which moreover emerge into the inlet conduit, conveying cut-outs for the filtrate and cassette filtrate return ports which moreover emerge into the filtrate outlet conduit and cassette retentate return ports which moreover emerge into the retentate outlet conduit.

The cassette feed ports, the ends of the conveying cut-outs, the cassette filtrate return ports and the cassette retentate return ports are configured such that they communicate with conduits formed in the filter cassette in tightly bearing relationship against the bearing surface of the manifold.

When the filter cassette bears against the bearing surface of this manifold, the surface of this cassette on the same side as the manifold is in tightly bearing relationship against the conveying cut-outs. Great care must be taken to avoid the cut-outs damaging the surface of the cassette in tightly bearing relationship.

SUMMARY

The invention aims to provide a manifold for a device for filtration with a set of at least one filter cassette, which is simple, economical, convenient and provides good performance.

For this, according to a first aspect the invention concerns a manifold for a filtration device with a set of at least one filter cassette to apply against a bearing surface of said manifold; which has an inlet conduit having at least one flow inlet for a fluid to treat, a filtrate outlet conduit having at least one filtrate flow outlet for a treated fluid termed filtrate, cassette feed ports for said fluid to treat, communicating with said inlet conduit, and cassette filtrate return ports for the filtrate, communicating with said filtrate outlet conduit, each said cassette feed port and cassette filtrate return port emerging through said bearing surface;

said manifold comprises a main block and an auxiliary block fastened to said main block;

with said bearing surface, said cassette feed ports and said cassette filtrate return ports belonging to the auxiliary block, which further comprises, on a counter-bearing surface situated on the opposite side to the bearing surface, first recesses into each of which emerges at least one cassette filtrate return port;

with said inlet conduit and said filtrate outlet conduit belonging to said main block, which further comprises cassette feed intermediate ports which each communicate with said inlet conduit and with a respective cassette feed port, conveying cut-outs each facing a respective said recess of said auxiliary block, and cassette filtrate return intermediate ports which each communicate with said filtrate outlet conduit and with a respective cassette filtrate return port.

Thus, the conveying cut-outs are within the manifold (and not on the bearing surface). In the absence of contact with the cassette, no particular care is required with regard to the cut-outs.

For a type of filter cassette known under the name Pellicon 2®, sold by the company Millipore, it is known to interpose a flat intermediate stainless steel plate between the filter cassette and the manifold, with that plate comprising first ports communicating with the cassette feed ports of the block, and second ports communicating with the ends of the cut-outs of the block. A respective flat seal is pressed against each of the two faces of this intermediate plate to provide the sealing between that plate and the bloc and between that plate and the Pellicon 2® filter cassette.

A similar intermediate plate is moreover known, but which is of plastic for another type of filter cassette known under the name Pellicon 3®, also sold by the company Millipore, with the flat seals being replaced by annular seals on that plate at the location of the ports communicating with the ends of the cut-outs of the block, and other annular seals directly on the Pellicon 3® filter cassette.

It will be noted that these removable intermediate plates have nothing to do with the auxiliary block of the manifold according to the invention, in particular because the auxiliary block is permanently fastened to the main block and because the auxiliary block comprises recesses on the same side as the main block which optimize the fluid path.

According to a preferred feature, said main block and said auxiliary block are of plastics material and said blocks are welded to each other.

The implementation of the manifold according to the invention is thus particularly convenient.

Preferably, said auxiliary block comprises ribs formed on said counter-bearing surface.

Such ribs are fully suited to the implementation of the welding, for example by linear vibration, such that these ribs melt partially for optimal fastening of the auxiliary block to the main block.

Preferably, said auxiliary block comprises second recesses on said counter-bearing surface that are configured such that said first and second recesses are passed alongside by said ribs.

The weld regions formed by these ribs are thus disposed at locations at which a fluid-tight connection is necessary, such that there is no need to take other measures to implement the connections.

According to another preferred feature, said cut-outs converge towards the cassette filtrate return intermediate port.

By virtue of the convergence of these cut-outs, the filtrate follows a fluid path with low pressure loss, in particular with regard to manifolds of the state of the art in which the filtrate, on leaving the cassette, that is to say from the cassette filtrate return ports to the filtrate outlet conduit, follows a path comprising at least two right-angle bends causing high pressure losses.

According to preferred, simple, convenient and economical features of the manifold according to the invention:

said auxiliary block comprises first grooves formed on the periphery of said first recesses, and said main block comprises, on a surface facing the counter-bearing surface of said auxiliary block, first beads introduced at least partially into said grooves.

said auxiliary block comprises second grooves formed on the periphery of said cassette feed ports, and said main block comprises, on a surface facing the counter-bearing surface of said auxiliary block, second beads introduced at least partially in said second grooves.

said main block has a retentate outlet conduit having a retentate flow outlet for a treated fluid termed retentate, cassette retentate return intermediate ports which each communicate with said retentate outlet conduit, and said auxiliary block comprises cassette retentate return ports each communicating with a said cassette retentate return intermediate port.

said inlet conduit, said filtrate outlet conduit, said cassette feed ports, said cassette filtrate return ports, said first recesses, said cassette feed intermediate ports, said cut-outs and said cassette filtrate return intermediate ports are formed by machining;

said auxiliary block has a smaller outer perimeter that the outer perimeter of said main block.

said manifold comprises two auxiliary blocks fastened on respective opposite sides of said main block, and said manifold comprises a supplementary block, which is solid and fastened to a surface of said main block.

According to a second aspect the invention concerns a device for filtration of a fluid with a set of at least one filter cassette comprising a manifold as disclosed above and a mechanical connection block provided with a space for receiving the manifold.

BRIEF DESCRIPTION OF THE DRAWINGS

The disclosure of the invention will now be continued with the description of embodiments, given below by way of illustrative and non-limiting example, with reference to the accompanying drawings, in which:

FIG. 6 is a view from the front of the main block;

FIGS. 7 and 8 are cross section views respectively on VII-VII and VIII-VIII in FIG. 6;

FIG. 9 is a view from the front showing an auxiliary block of the manifold in isolation;

FIG. 10 is the cross-section view on X-X of FIG. 9;

FIGS. 11 and 12 are perspective views of a filtration device, respectively without the cassette and the manifold and with the cassette and the manifold;

FIG. 13 is a view showing a filter cassette diagrammatically; and

DETAILED DESCRIPTION

Figure 1:
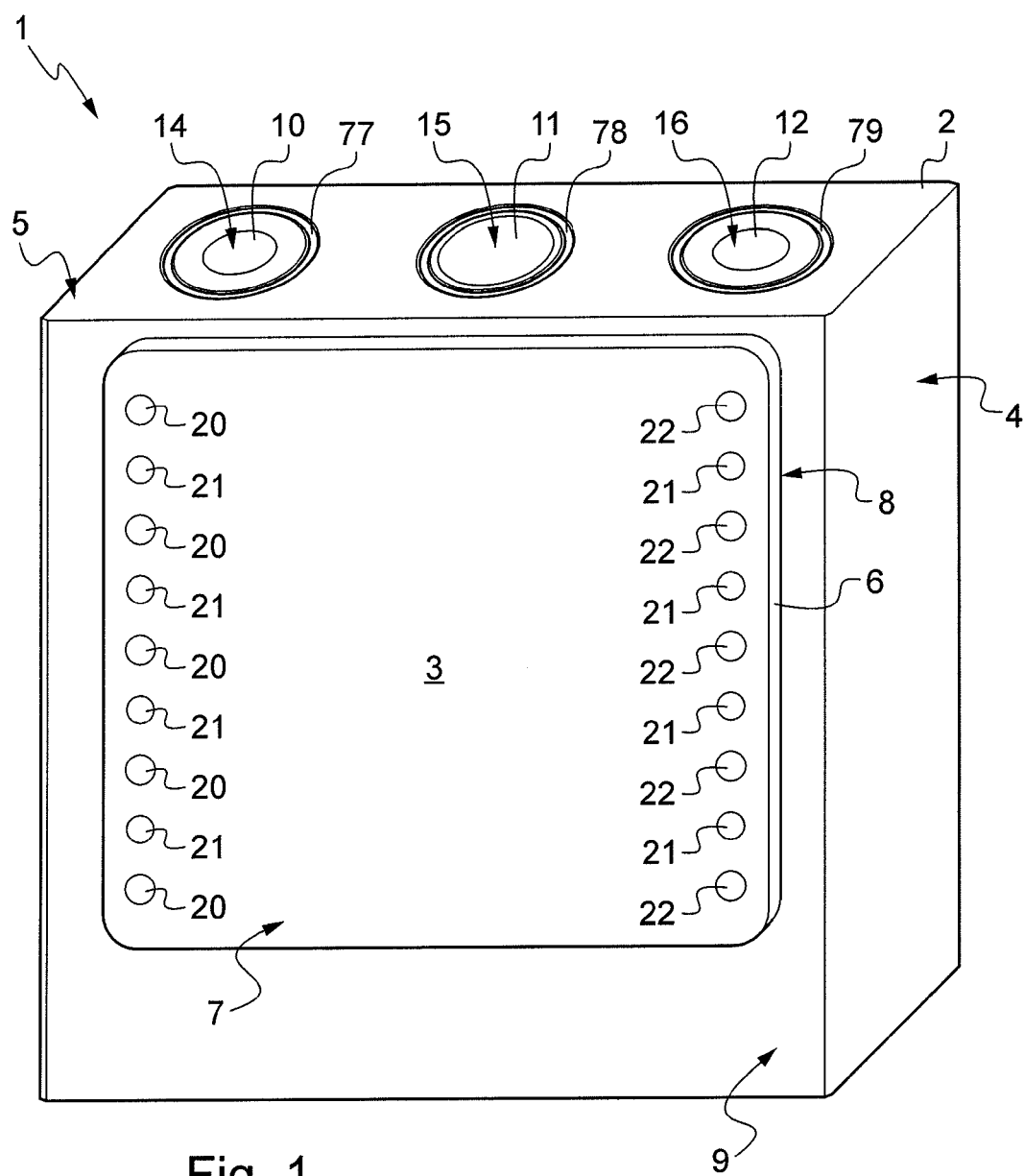
FIG. 1 is a perspective view of a manifold according to a first embodiment of the invention.

FIGS. 1 to 10 illustrate a manifold 1 of plastics material that is adapted to be inserted into a mechanical connection block 42 of stainless steel of a filtration device 40 provided with a set of filter cassettes 50 (FIGS. 11 and 12), which device 40 forms part of a treatment installation.

In the example described, the manifold 1 and the set of cassettes 50 are configured to obtain treatment by tangential filtration.

In tangential filtration, a fluid to treat enters the set of cassettes 50 via a feed conduit 70 (FIG. 13), a first fraction of the fluid termed retentate flows tangentially to a membrane (not shown) of each cassette 50 and a second fraction of the fluid termed filtrate, passes through the membrane of each cassette 50 and flows perpendicularly to the retentate, then the filtrate and the retentate exit the set of cassettes 50, respectively via filtrate and retentate outlet conduits 71 and 72.

It is thus possible to retrieve different fractions of treated fluid, for example the filtrate or the retentate, depending on the type of application.

The manifold 1 comprises a main block 2 of plastics material and an auxiliary block 3 of plastics material fastened by welding to the main block 2.

The main block 2 and the auxiliary block 3 are here of polyoxymethylene (POM), also termed acetal.

Here, the welding operation is carried out by linear vibration.

The welding operation on such blocks of plastics material 2 and 3 is particularly simple to implement.

More particularly, in the case of the blocks of plastics material 2 and 3, the welding operation is carried out without degrading the members in proximity.

The main block 2 comprises a body 4 having a substantially parallelepiped shape.

The body 4 comprises an inlet conduit 14, a filtrate outlet conduit 15 and a retentate outlet conduit 16.

Each conduit 14, 15 and 16 respectively has, on the upper face 5 of the body 4, a first flow inlet 10 for the fluid to treat, a first filtrate flow outlet 11 for the filtrate and a first retentate flow outlet 12 for the retentate.

Around each inlet 10 and outlet 11, 12 are formed respective annular grooves 77, 78 and 79 adapted to receive seals and pipes (not shown), for example rigid stainless steel or flexible plastic pipes, for conveying the fluids to or from other parts of the treatment installation.

Each conduit 14, 15 and 16 respectively furthermore has, on the lower face 13 of the body 4, a second flow inlet 17 for the fluid to treat (FIG. 5), a second filtrate flow outlet 18 for the filtrate (FIG. 4) and a second retentate flow outlet 23 for the retentate (FIG. 7).

As earlier, around each inlet 17 and outlet 18, 19 are formed respective annular grooves 34, 36 and 27 adapted to receive seals and pipes (not shown), for example rigid stainless steel or flexible plastic pipes, for conveying the fluids to or from other parts of the treatment installation.

If it is wished to block off one of these inlets and/or outlets, it suffices to insert a plug the annular rim of which is introduced into one of its annular grooves.

These conduits 14, 15 and 16 are formed by machining, and in particular by boring the body 4, at least over a major portion of its height.

Figure 4:
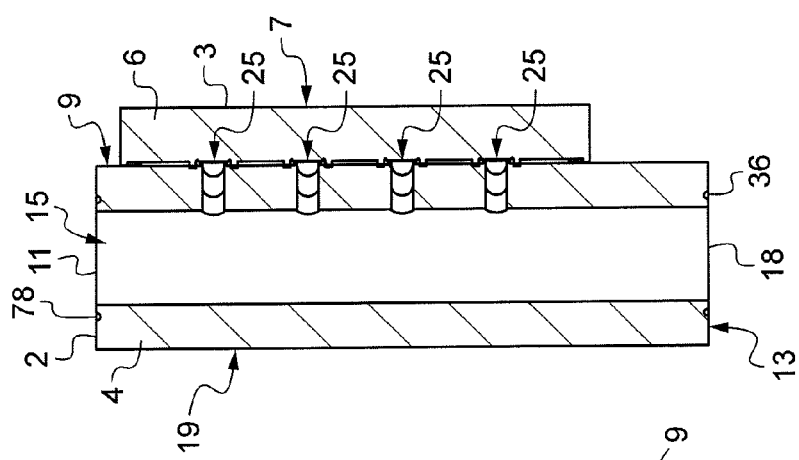
Figure 3:
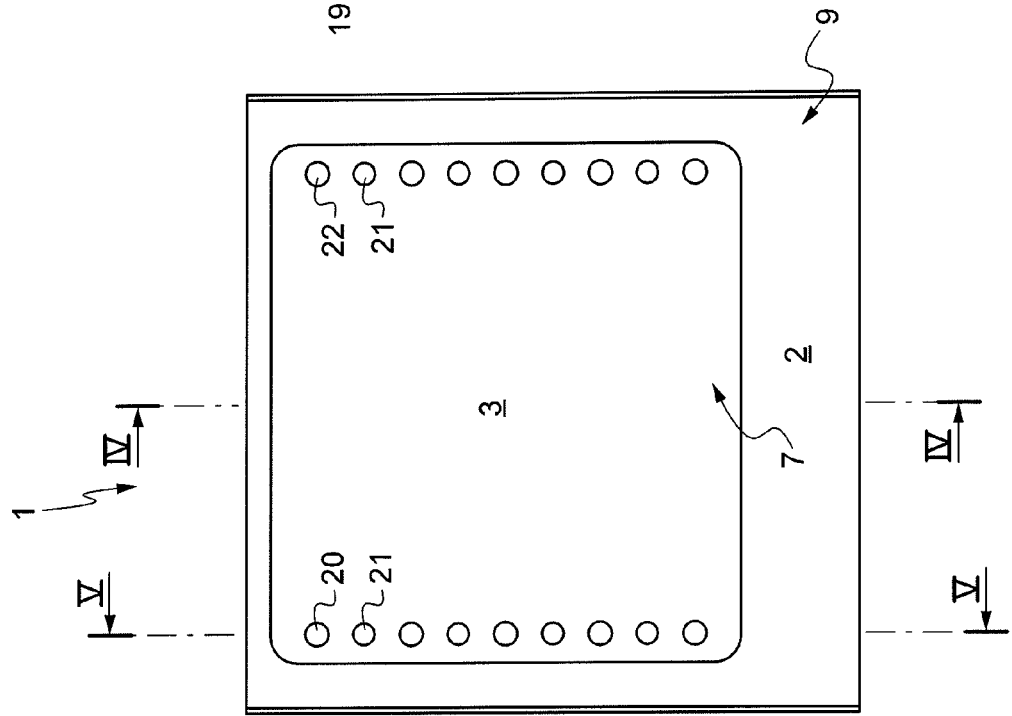
FIG. 3 is a view from the front of the manifold.

It can be seen for example in FIG. 4 that the filtrate outlet conduit 15 is formed over the entire height of the body 4 of the main block 2.

Figure 5:
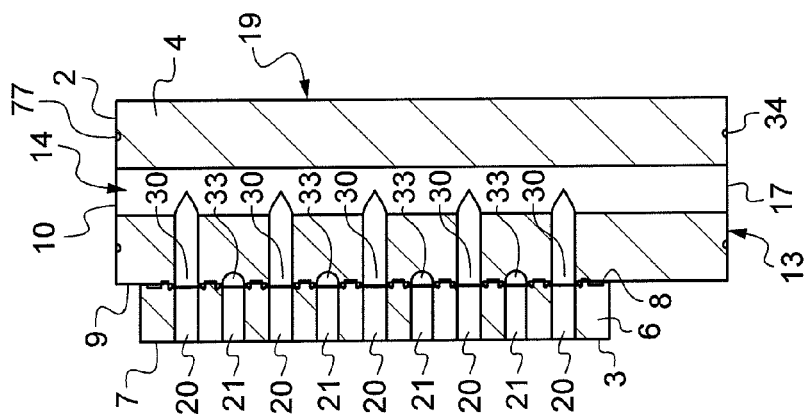
FIGS. 4 and 5 are cross-section views on IV-IV and V-V in FIG. 3.

It can also be seen in FIG. 5 that the supply conduit 14 is formed over the entire height of the body 4 of the main block 2.

Of course, depending on the connections to make for the treatment, the conduits 14, 15 and 16 are blocked off at the appropriate inlets and/or outlets 10, 17, 11, 18, 12 and 23 in the manner indicated above.

The auxiliary block 3 comprises a body 6 having a substantially parallelepiped shape, a flat bearing surface 7 and on the opposite side to the flat bearing surface 7 a counter-bearing surface 8 which is not flat.

The counter-bearing surface 8 is applied against a surface 9 of the body 4 of the main block 2, against which surface 9 the counter-bearing surface 8 of the auxiliary block 3 is fastened permanently by welding.

The auxiliary block 3 comprises cassette feed ports 20 for the fluid to treat, cassette filtrate return ports 21 and cassette retentate return ports 22.

These cassette feed ports 20, cassette filtrate return ports 21 and cassette retentate return ports 22 each emerge on the surfaces 7 and 8 of the auxiliary block 3.

Along a vertical edge of the auxiliary block 3 there are aligned here five cassette feed ports 20 and four cassette filtrate return ports 21, with each cassette filtrate return port 21 being situated between two cassette feed ports 20.

Along the other vertical edge of the auxiliary block 3 there are aligned here five cassette retentate return ports 22 and four cassette filtrate return ports 21, with each cassette filtrate return port 21 being situated between two cassette retentate return ports 22.

The auxiliary block 3 has a smaller perimeter than the perimeter of the main block 2.

Cassette filtrate return intermediate ports 25 of oblong shape (FIG. 6) aligned one above the other half way between the vertical edges of the auxiliary block 3 emerge on the surface 9 of the main block 2.

These cassette filtrate return intermediate ports 25 extend within the body 4 of the main block 2 and furthermore emerge in the filtrate outlet conduit 15.

These cassette filtrate return intermediate ports 25 are formed by machining, and in particular by boring.

The main block 2 comprises an unbroken surface 19 on the opposite side to the surface 9. In other words, no intermediate port emerges on the surface 19.

As illustrated in FIG. 5, the main block 2 has a surface 9 into which cassette feed intermediate ports 30 also emerge, which extend in the body 4 until they furthermore emerge in the supply conduit.

The main block 2 further comprises four conveying cut-outs for the filtrate 35 at the back of which are formed the cassette filtrate return intermediate ports.

The cassette feed ports 20 pass through the body 6 of the auxiliary block 3 and communicate with the cassette feed intermediate ports 30 of the main block 2.

The cassette filtrate return intermediate ports 21 also pass through the body 6 of the auxiliary block 3 and communicate with the ends 31 and 33 of the cut-outs for conveying the filtrate 35 of the main block.

Figure 2:
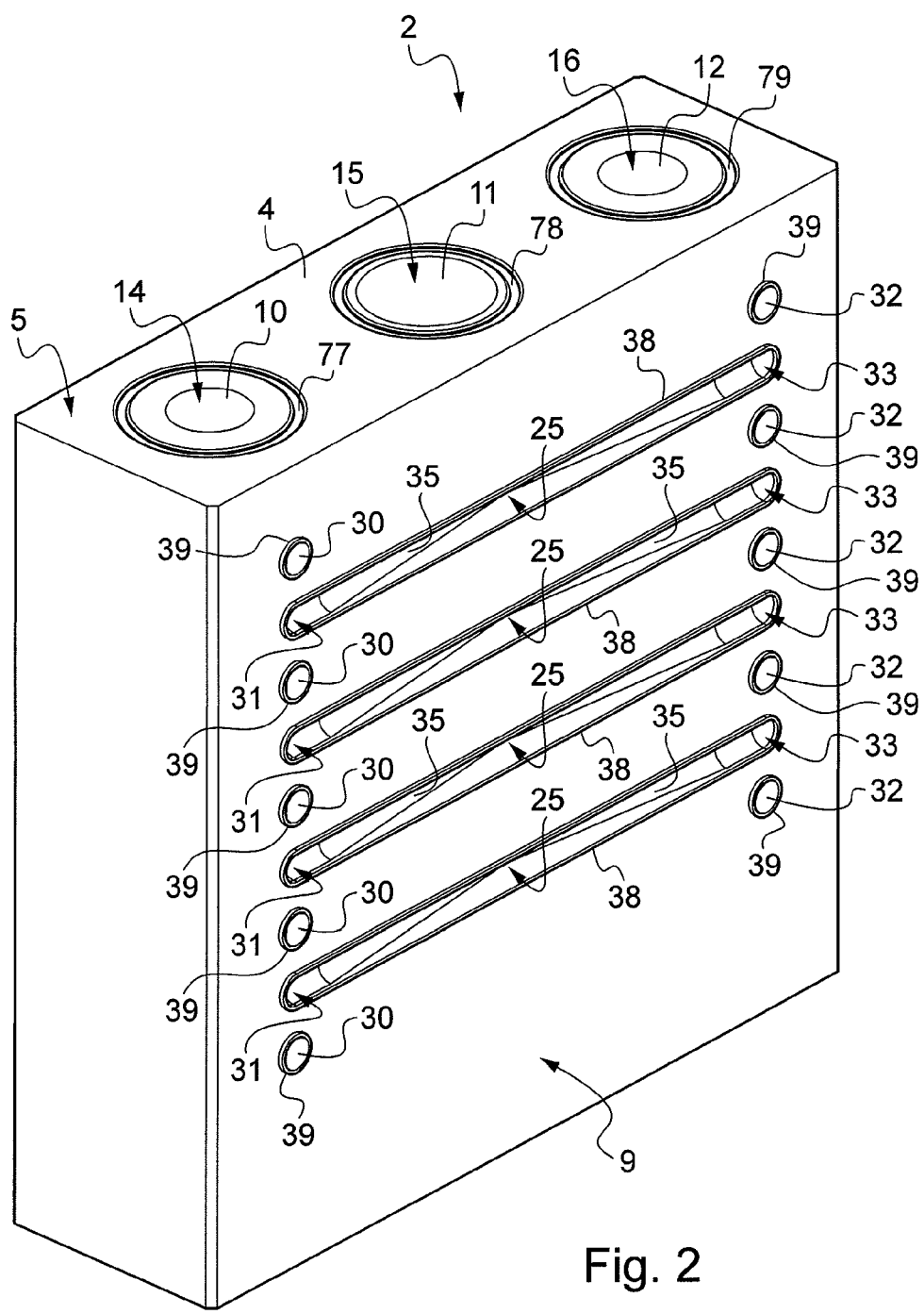
FIG. 2 is a perspective view of a main block of the manifold.

FIGS. 2 and 6 show the main block 2 without the auxiliary block 3.

The cut-outs 35 can be seen more particularly, which extend horizontally between their ends 31 and 33, as well as the cassette filtrate return intermediate port 25 which is situated half way between the ends 31 and 33.

On this surface 9, along the opposite edge to the edge along which emerge the cassette feed intermediate ports 30, cassette retentate return intermediate ports 32 furthermore emerge.

Of course, the ports 30 and the ends 31, and respectively the ports 32 and the ends 33, are aligned successively like the ports 20 and 21, and respectively 22 and 21.

The cassette retentate return intermediate ports 32 pass through the body 4 of the main block 2 until they emerge moreover in the retentate outlet conduit 16 (FIG. 7).

Each cut-out 35 converges towards a cassette filtrate return intermediate port 25 (FIG. 8), that is to say that it extends from its ends 31 to the respective cassette filtrate outlet intermediate port 25, while progressively sinking into the body 4 of the main block 2.

At the location of its ends 31 and 33, each cut-out 35 has a curved first portion 76 then a flat second portion 24 extending parallel to the surface 9, and lastly a third portion 26 of ramp form which sinks into the body 4 until reaching the respective emerging intermediate port 25.

These portions 76, 24 and 26 enable good flow of the filtrate while it is conveyed until its evacuation by the filtrate outlet conduit 15 and a fluid path minimizing pressure losses.

The main block 2 further comprises first and second beads 38, 39 respectively formed around the cut-outs 35 and the cassette feed intermediate ports 30.

FIGS. 9 and 10 more particularly show the counter-bearing surface 8 of the auxiliary block 3.

On this counter-bearing surface 8 are formed first recesses 28 which each pass behind two cassette filtrate return ports 21 arranged horizontally at the same level, with the first 28 extending horizontally between these two cassette filtrate return ports 21.

These first recesses 28 are disposed facing the cut-outs 35 of the main block 2 such that the filtrate also passes into these first recesses 28.

On the periphery of these first recesses 28 are formed first grooves 37 to receive the first beads 38 (visible in FIG. 2).

On this counter-bearing surface 8 are also formed second recesses 48 extending horizontally between the periphery of a cassette retentate return port 22 and the periphery of a cassette feed port 20, with its ports 20 and 22 being horizontally aligned.

On this counter-bearing surface 8 are also formed second grooves 29 which are annular and concentric respectively around the cassette feed ports 20 and the cassette retentate return ports 22, with its second grooves 29 receiving the second beads 39 (visible in FIG. 2).

Ribs 41 are thus formed on the counter-bearing surface 8 of the auxiliary block 3, respectively between the first and second recesses 28, 48, on the periphery of that lateral surface 8, and on the periphery of each cassette feed port 20 and cassette retentate return port 22.

These ribs 41 pass alongside the first and second recesses 28, 48 and enable the deformation of the auxiliary block 3 to be avoided when the filter cassettes 50 are compressed against it.

As a matter of fact, on account of their arrangement between the recesses 48 and 28, at the time of the welding operation, the ribs 41 melt at least partially to be joined to the surface 9 of the main block 2.

Furthermore, at the time of the welding operation by linear vibration, the complementarity of the beads 38, 39 and the respective grooves 37, 29 enables the melted plastics material of the blocks 2 and 3 to be channeled, in particular by the ribs 41.

The ribs 41, the beads 38, 39 and the respective grooves 37, 29 thus participate in the formation of fluid-tight zones.

Advantageously, the manifold 1 does not therefore comprise a seal between the main block 2 and the auxiliary block 3.

Figure 11:
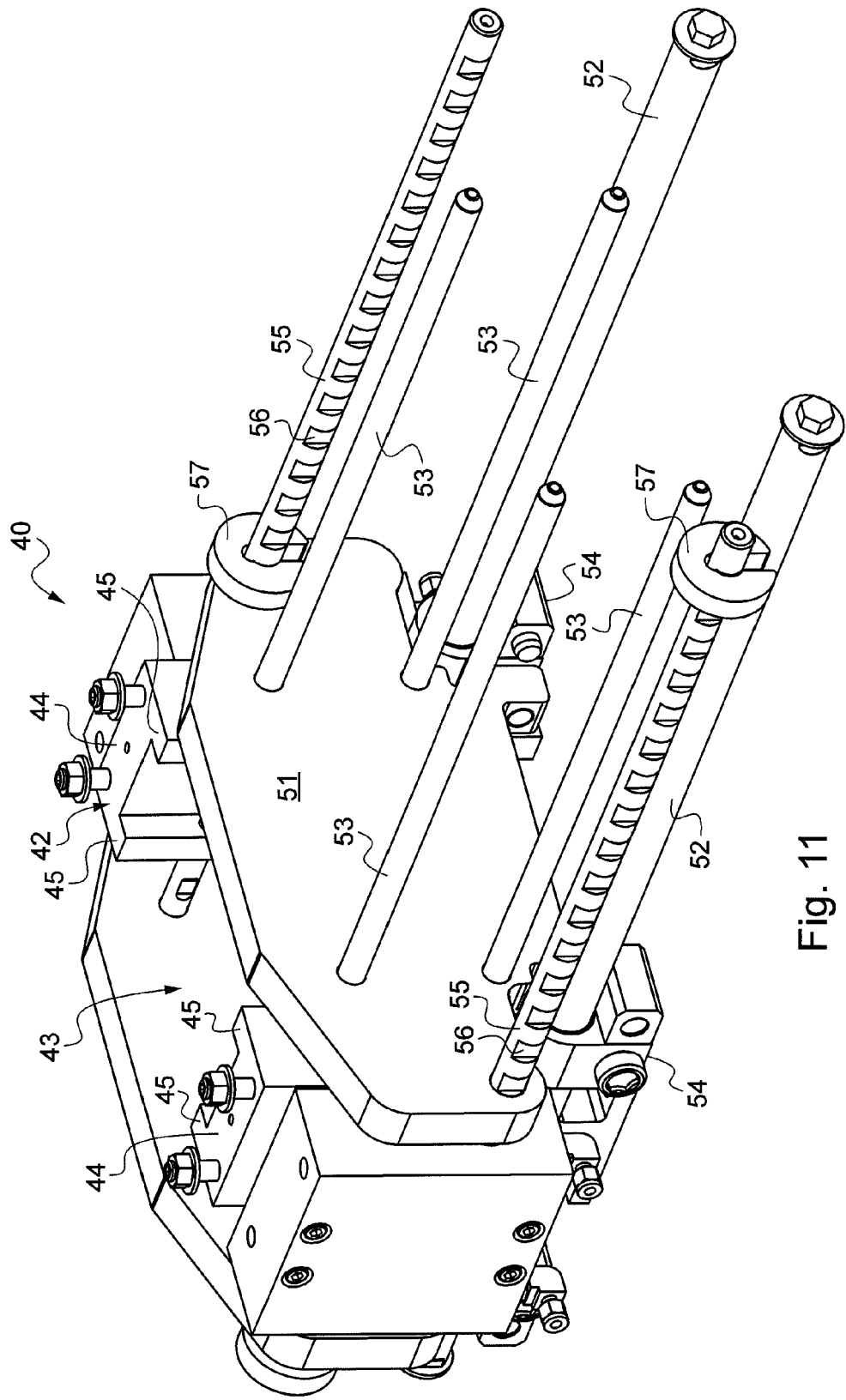

In FIG. 11 the filtration device 40 is represented which comprises a mechanical connection block 42 in which is formed a space 43 for receiving the manifold 1.

This mechanical connection block 42 comprises two cheeks 44 each having two wings 45 facing each other and a lateral wall linking the two wings 45.

The height of the cheeks 44 is at least equivalent to that of the manifold 1, and the space between the two wings 45 of each cheek 44 is equivalent to the depth of the manifold 2 for its introduction by sliding into the space 43 of the mechanical connection block 42.

When the manifold 1 is inserted into the mechanical connection block 42, an upper wall 46 is placed on the upper face 5 of the manifold 1, then screwed by four fixing screws 47 inserted into the mechanical block 42.

The holding device 40 further comprises a clamping plate 51, two rods 52 for holding that clamping plate 51, four rods 53 for supporting the filter cassette 50 and means for clamping the filter cassette 50.

The clamping plate 51 is disposed away from the manifold 1 so as to clamp the set of filter cassettes 50 situated between them.

This clamping plate 51 is borne by the rods 52 by virtue of two rings 54 each linked both to a rod 52 and to the plate 51.

This plate further comprises four through holes receiving the rods 53 which bear the cassette 50.

The rods 52 for holding the clamping plate 51 and the rods 53 for supporting the cassette 50 emerge from the mechanical connection block 42.

So long as it is not clamped, the clamping plate 51 slides along the rods 52 and 53.

The clamping means are formed by two actuators (not visible) disposed in the mechanical connection block 42 and which are each provided with a body and a piston that is moveable relative to the body, and with two rods 55 comprising a plurality of regularly spaced notches 56, which rods 55 emerge from the mechanical connection block 42 and reach respectively in the direction of two through holes formed in the clamping plate 51.

The body of each actuator is connected to the mechanical connection block 42 and the moveable piston of each actuator is connected to a notched rod 55.

Locking members 57 are furthermore fastened to the notched rods 56, just behind the clamping plate 51, to lock that plate 51 at the time of the operation of clamping the set of filter cassettes 50, and in particular when the notched rod 55 is moved by the moveable piston of the actuator in order to bring the clamping plate 51 towards the lateral bearing surface 7 of the auxiliary block 3.

Thus, when the actuator pulls on the notched rod 55, the set of filter cassettes 50 is clamped until it is compressed between the auxiliary block 2 of the manifold 1 and the clamping plate 51, with the cassette feed ports 20, the cassette filtrate return ports 21 and the cassette retentate return ports 22 communicating respectively with the feed, filtrate return, and retentate return conduits 70, 71 and 72 formed in the filter cassette 50 bearing against the bearing surface 7 of the auxiliary block 3 (FIG. 13).

The face of this cassette 50 and the bearing surface 7 of the auxiliary block 3 are similar, such that there is no particular precaution to take with regard to clamping.

The face of this cassette 50 does not tightly bear against the cut-outs 35 of the main block.

Figure 14:
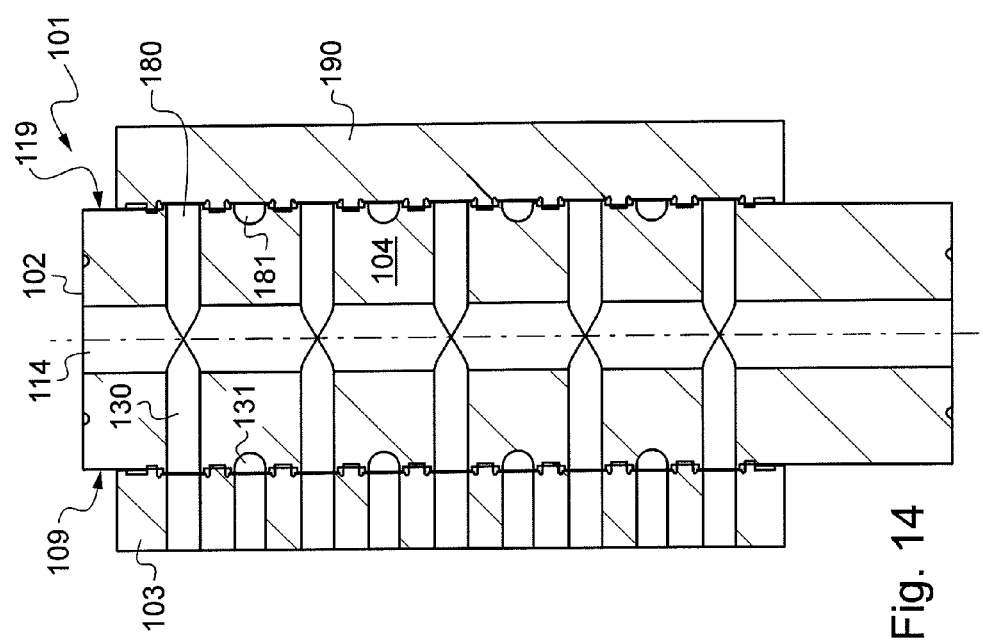

FIG. 14 illustrates a second embodiment of the manifold.

Generally speaking, the same reference numbers increased by 100 are used for similar elements.

In contrast to the main block 2 of the manifold 1 illustrated in FIGS. 1 to 10, the main block 102 of the manifold 101 illustrated in FIG. 14 comprises a surface 119 on which emerge cassette feed intermediate ports, cassette filtrate return intermediate ports 181 and cassette retentate return intermediate ports (not shown), with the feed intermediate ports 180 and the retentate return intermediate ports extending within the body 104 until they furthermore emerge respectively in the supply conduit 114 and in the retentate outlet conduit (not shown).

This manifold further comprises a supplementary block 190 of plastics material fastened by welding onto the surface 119, in the same way as the auxiliary block 103 onto the surface 109.

This supplementary block 190 is solid, that is to say that it is free of any port.

Figure 15:
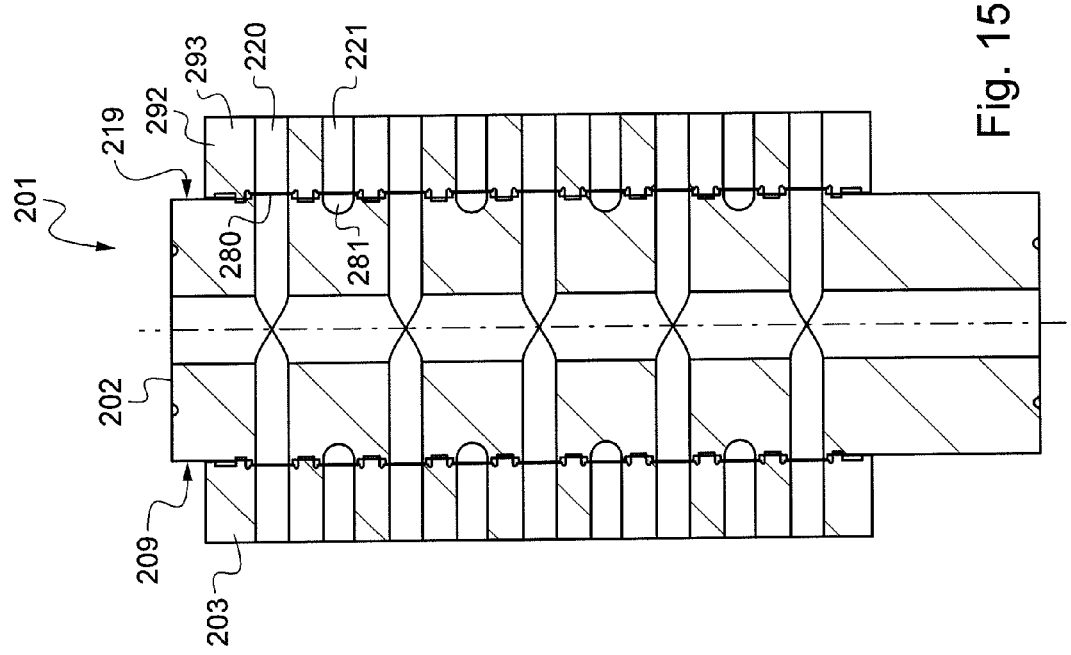
FIGS. 14 and 15 are cross-section views similar to FIG. 5, according to other embodiments of the invention.

FIG. 15 illustrates a third embodiment of the manifold.

Generally speaking, for similar elements the same reference numbers have been used as for the first embodiment, but increased by 200.

The manifold 201 illustrated in FIG. 15 is identical to the manifold 101 of FIG. 14, except for the fact that, in place of a solid supplementary auxiliary block, it comprises a supplementary auxiliary block 292 of plastics material that is identical to the auxiliary block 203.

The block 201 thus comprises two auxiliary blocks 203 and 292 of plastics material fastened by welding onto the respective surfaces 209 and 219 of the main block 202.

This auxiliary block 292 this comprises cassette feed ports 220 passing through the body 293 of the auxiliary block 292 and communicating with the feed intermediate ports 280, cassette filtrate return ports 221 passing through the body 293 of the auxiliary block 292 and communicating with the respective cassette filtrate return intermediate ports 281, and cassette retentate return ports (not shown) passing through the body 293 of the auxiliary block 292 and communicating with the respective cassette retentate return intermediate ports (not shown).

In variants that are not illustrated:
the main block and the auxiliary block are of polysulfone (PSU) rather than of polyoxymethylene (POM);
the main block is formed by molding rather than by machining, with its flow inlet, flow outlets, inlet and outlet conduits, cassette feed intermediate ports, cassette filtrate return intermediate ports, cassette retentate return intermediate ports, and cut-outs being formed at the time of the molding operation;
the auxiliary block is formed by molding rather than by machining, with its cassette feed ports, cassette filtrate return ports, cassette retentate return ports, first and second recesses, and first and second grooves being formed at the time of the molding operation;
the welding operation is not linear vibration welding but instead welding by ultrasound or by infrared;
the mechanical connection block is of plastics material rather than of stainless steel;
the filtration device uses two filtrate flow outlets, one on the upper face and the other on the lower face of the main block, and the case arising one of the two filtrate outlets serves as a drain; and/or
the main block such as the block 2 of FIGS. 1 to 10 comprises on it surface such as 19 a supplementary block such as the supplementary block 190 (FIG. 14).

In another variant not illustrated, several filtration devices are superposed and thus several manifolds are connected at the flow inlet and outlets situated at the ends of the inlet and outlets conduits for the fluid. These assemblies require sealing means at each junction between two manifold blocks, at the location of the grooves formed around that flow inlet and flow outlets.

It should be noted more generally that the invention is not limited to the examples described and represented.

The invention claimed is:
1. A manifold for a filtration device with a set of at least one filter cassette to apply against a bearing surface of said manifold; which has an inlet conduit having at least one flow inlet for a fluid to treat, a filtrate outlet conduit having at least one filtrate flow outlet for a treated fluid termed filtrate, cassette feed ports for said fluid to treat, communicating with said inlet conduit, and cassette filtrate return ports for the filtrate, communicating with said filtrate outlet conduit, each said cassette feed port and cassette filtrate return port emerging through said bearing surface;

wherein said manifold comprises a main block and an auxiliary block directly and permanently fastened to said main block;

with said bearing surface, said cassette feed ports and said cassette filtrate return ports belonging to the auxiliary block, which further comprises, on a counter-bearing surface situated on the opposite side to the bearing surface, first recesses into each of which emerges at least one cassette filtrate return port;

with said inlet conduit and said filtrate outlet conduit belonging to said main block, which further comprises cassette feed intermediate ports which each communicate with said inlet conduit and with a respective cassette feed port, conveying cut-outs each facing a respective said recess of said auxiliary block, and cassette filtrate return intermediate ports which each communicate with said filtrate outlet conduit and with a respective cassette filtrate return port.

2. A manifold according to claim 1, wherein said main block and said auxiliary block are of plastics material and said blocks are welded to each other.

3. A manifold according to claim 1, wherein said auxiliary block comprises ribs formed on said counter-bearing surface.

4. A manifold according to claim 3, wherein said auxiliary block comprises second recesses on said counter-bearing surface that are configured such that said first and second recesses are passed alongside by said ribs.

5. A manifold according to claim 1, wherein said cut-outs converge towards the cassette filtrate return intermediate ports.

6. A manifold according to claim 1, wherein said auxiliary block comprises first grooves formed on the periphery of said first recesses, and said main block comprises, on a surface facing the counter-bearing surface of said auxiliary block, first beads introduced at least partially into said grooves.

7. A manifold according to claim 6, wherein said auxiliary block comprises second grooves formed on the periphery of said cassette feed ports, and said main block comprises, on a surface facing the counter-bearing surface of said auxiliary block, second beads introduced at least partially in said second grooves.

8. A manifold according to claim 1, wherein said main block has a retentate outlet conduit having a retentate flow outlet for a treated fluid termed retentate, cassette retentate return intermediate ports which each communicate with said retentate outlet conduit, and said auxiliary block comprises cassette retentate return ports each communicating with a said cassette retentate return intermediate port.

9. A manifold according to claim 1, wherein said inlet conduit, said filtrate outlet conduit, said cassette feed ports, said cassette filtrate return ports, said first recesses, said cassette feed intermediate ports, said cut-outs and said cassette filtrate return intermediate ports are formed by machining.

10. A manifold according to claim 1, wherein said auxiliary block has a smaller outer perimeter that the outer perimeter of said main block.

11. A manifold according to claim 1, wherein it comprises two auxiliary blocks fastened on respective opposite sides of said main block.

12. A manifold according to claim 1, wherein it comprises a supplementary block, which is solid and fastened to a surface of said main block.

13. A device for filtration of a fluid with a set of at least one filter cassette comprising a manifold according to claim 1 and a mechanical connection block provided with a space for receiving said manifold.

* * * * *